United States Patent
Seidler, II

(10) Patent No.: US 8,558,187 B1
(45) Date of Patent: Oct. 15, 2013

(54) NEUTRON DETECTION

(75) Inventor: William Arnold Seidler, II, Brownsboro, AL (US)

(73) Assignee: The Boeing Company, Chicago, IL (US)

(*) Notice: Subject to any disclaimer, the term of this patent is extended or adjusted under 35 U.S.C. 154(b) by 1057 days.

(21) Appl. No.: 12/702,969

(22) Filed: Feb. 9, 2010

(51) Int. Cl.
  *G01T 3/00* (2006.01)
  *G01T 1/24* (2006.01)
  *G01T 3/08* (2006.01)
  *G01T 1/29* (2006.01)

(52) U.S. Cl.
  USPC ........... 250/390.01; 250/370.01; 250/370.05; 250/370.08

(58) Field of Classification Search
  USPC ............ 250/370.01, 370.05, 370.08, 390.1, 250/390.01
  See application file for complete search history.

(56) References Cited

U.S. PATENT DOCUMENTS

| | | | |
|---|---|---|---|
| 3,728,593 A | | 4/1973 | Coleman |
| 4,785,186 A | * | 11/1988 | Street et al. ............... 250/370.14 |
| 5,019,886 A | | 5/1991 | Sato et al. |
| 5,399,863 A | * | 3/1995 | Carron et al. ............ 250/370.05 |
| 5,940,460 A | | 8/1999 | Seidel et al. |
| 7,372,009 B1 | | 5/2008 | Losee et al. |
| 7,667,206 B1 | * | 2/2010 | Hindi et al. ............... 250/390.07 |
| 7,847,260 B2 | * | 12/2010 | Inbar ........................ 250/370.11 |

OTHER PUBLICATIONS

"STL-20: Conducting Polymers for Neutron Detection," Paper No. DOE/NV/25946-330 (2007) to Kimblin et al.*
Mascarenhas et al., "Development of a Neutron Scatter Camera for Fission Neutrons", IEEE Nuclear Science Symposium Conference Record, 2006, vol. 1, pp. 185-188.
Tremsin et al., "A New Concept of Thermal Neutron Counting with Sub-Microsecond Timing Resolution", IEEE Transactions on Nuclear Science, Jun. 2008, vol. 55 Issue 3, pp. 1664-1669.
Bateman et al., "A 2 dimensional GMSD based imaging detector for neutrons", 2004 IEEE Nuclear Science Symposium Conference Record, vol. 1, pp. 470-474.
Gunji et al., "Development of neutron imaging detector using capillary phenomena and liquid scintillator", 2005 IEEE Nuclear Science Symposium Conference Record, Oct. 2005, vol. 5, pp. 2899-2902.
Bowden et al., "Directional Detection of Fast Neutrons Using a Time Projection Chamber", 2009, INMM Annual Meeting, Tucson AZ, pp. 1-8.
Norman et al., "Active Nuclear Material Detection and Imaging", IEEE Nuclear Science Symposium, 2005, pp. 1-6.

(Continued)

*Primary Examiner* — David Porta
*Assistant Examiner* — Kenneth J Malkowski
(74) *Attorney, Agent, or Firm* — Yee & Associates, P.C.

(57) ABSTRACT

An embodiment of the present disclosure provides a method and apparatus for neutron detection. The method comprises receiving neutrons into a number of sensing layers of a plurality of diodes of a number of arrays. Each diode has a sensing layer. A plurality of reactions between the neutrons and each sensing layer of the number of sensing layers are captured in a set of layers for each sensing layer in the number of sensing layers. Each sensing layer is located between the set of layers for each sensing layer. Each set of layers are intrinsic. The method also comprises generating a current pulse for each sensing layer of the number of sensing layers in response to capturing the result of a reaction between the neutrons and each sensing layer of the number of sensing layers.

21 Claims, 6 Drawing Sheets

(56) References Cited

OTHER PUBLICATIONS

"Novel Neutron Detector for High Rate Imaging Applications Final Report", Department of Energy DOE Grant No. DE-FG03-01ER83297, Proportional Technologies, Inc. Aug. 27, 2004, pp. 1-54.

Guardiola et al., "Neutron Detection with Silicon Devices", Spanish Conference on Electron Devices, 2009, CDE 2009, pp. 54-56.

Kitaguchi et al., "Silicon semiconductor detectors for various nuclear radiations", IEEE Transactions on Nuclear Science, Jun. 1996, vol. 43, No. 3, pp. 1846-1850.

McFarland et al., "Multi-dimensional neutron computed tomography using cooled charge-coupled devices", IEEE Transactions on Nuclear Science, Apr. 1991, vol. 38, No. 2, pp. 612-622.

Sanders et al., "Development of a GaAs-based neutron tomography system for the assay of nuclear fuel", 2001 IEEE Nuclear Science Symposium Conference Record, vol. 4, San Diego, CA, pp. 2326-2329.

Uher et al., "Highly sensitive silicon detectors of thermal neutrons", 2006 IEEE Nuclear Science Symposium Conference Record, vol. 3, pp. 1346-1349.

"The PIN Diode Circuit Designers' Handbook", Microsemi-Watertown, 1998, pp. 1-137.

Byrd et al., "Nuclear Detection to Prevent or Defeat Clandestine Nuclear Attack", IEEE Sensors Journal, vol. 5, No. 4, Aug. 2005, pp. 593-609.

Jovanovic et al., "Directional Neutron Detection Using a Time Projection Chamber", IEEE Transactions on Nuclear Science, vol. 56, No. 3, Jun. 2009, pp. 1218-1223.

Lacy et al., "Novel Neutron Detector for High Rate Imaging Applications", Nuclear Science Symposium Conference Record, 2002 IEEE, pp. 392-396.

Mascarenhas et al., "A fast neutron imaging detector for standoff detection of special nuclear material", Sandia National Laboratories, 2009, pp. 1-4.

Mascarenhas et al., "Results with the Neutron Scatter Camera", IEEE Transacitons on Nuclear Science, vol. 56, No. 3, Jun. 2009, pp. 1269-1273.

Nagarkar et al., "Structured LiI Scintillator for Thermal Neutron Imaging", IEEE Transactions on Nuclear Science, vol. 48, No. 6, Dec. 2001, pp. 2330-2334.

Robertson et al., "A class of boron-rich solid-state neutron detectors", May 2002, American Institute of Physics, Applied Physics Letters, vol. 80, No. 19, pp. 3644-3646.

Schulte et al., "Development of a Thermal Neutron Detector System Using Large Area Silicon Detectors", 1995, IEEE, pp. 414-417.

Shestakova et al., "A High Spatial Resolution Sensor for Thermal Neutron Imaging", 2007 IEEE Transactions on Nuclear Science, vol. 54, No. 5, pp. 1792-1800.

Siegmund et al., "High Spatial and Temporal Resolution Neutron Imaging with Microchannel Plate Detectors", IEEE Transactions on Nuclear Science, vol. 56, No. 3, Jun. 2009, pp. 1203-1209.

Tremsin et al., "High efficiency thermal neutron imaging with sub-microsecond timing resolution", 2006 IEEE Nuclear Science Symposium Conference Record, pp. 193-198.

Vanier et al., "Directional detection of fission-spectrum neutrons", 2007 IEEE, pp. 1-5.

Vanier et al., "Stand-off Detection of Special Nuclear Materials Using Neutron Imaging Methods", 2008 IEEE Nuclear Science Symposium Conference Record, pp. 681-685.

Woolf et al., "Development of a Real-Time Fast Neutron Imaging Telescope (FNIT) for the Detection of SNM", IEEE Conference on Technologies for Homeland Security, 2008 pp. 133-138.

Woolf et al., "Imaging and Spectroscopy of Fission Neutrons with the FNIT Experiment", HST '09. IEEE Conference on Technologies for Homeland Security, 2009, pp. 274-281.

\* cited by examiner

NEUTRON DETECTION

BACKGROUND INFORMATION

1. Field

The present disclosure relates generally to neutron detection and, in particular, to a method and apparatus for detecting a concentrated source of neutrons.

2. Background

Neutron detection is detecting neutrons entering a detector. Detectors may be of the Geiger-Müller counter, scintillation counter and semiconductor detector.

A Geiger-Müller counter consists of a Geiger-Müller tube and a counting circuit which counts the number of current pulses generated in the tube versus time. To detect neutrons, the tube is filled will a low pressure inert gas such as helium 3 that reacts with neutrons and produces ionizing radiation. Ionizing radiation consists of subatomic particles or electromagnetic waves that are energetic enough to detach electrons from atoms or molecules, ionizing them. Ionizing radiation comes from radioactive materials. The walls and center conductor of the tube are metal with the center conductor charged to several hundreds of volts. The electrons and ions generated by neutron reactions with the gas are collected by walls or center conductors of the tube and appear as a current pulse on the center conductor that is recorded by the counting circuit.

A scintillation counter measures ionizing radiation through the production of light as the scintillation material excited by the ionizing radiation returns to its ground state. When a charged particle strikes a scintillator, this flash of light is produced, which may or may not be in the visible region of the spectrum. Each charged particle produces a flash amplitude that is proportional to the energy of the charged particle. If a flash is produced in a visible region, it can be observed through a microscope and counted by a photomultiplier tube. The association of a scintillator and photomultiplier tube with the counter circuits forms the basis of the scintillation counter apparatus.

Another type of detector is a semiconductor detector. In these detectors, radiation is measured by means of the number of charge carriers set free in the detector which is arranged between two electrodes. Ionizing radiation produces free electrons and holes. The number of electron-hole pairs is proportional to the energy transmitted by the radiation to the semiconductor. Under the influence of an electric field, electrons and holes travel to the electrodes resulting in a pulse that can be measured in an outer circuit. The holes travel in the opposite direction and can also be measured. As the amount of energy required to create an electron-hole pair is known, and is independent of the energy of the incident radiation, measuring the number of electron-hole pairs allows the energy of the incident radiation to be found.

Accordingly, it would be advantageous to have a method and apparatus, which takes into account one or more of the issues discussed above as well as possibly other issues.

SUMMARY

An embodiment of the present disclosure provides an apparatus comprising a first semiconductor layer, a second semiconductor layer, and a sensing layer. The first semiconductor layer is substantially non-conducting and is substantially undoped. The sensing layer is located under the first semiconductor layer. The sensing layer is configured to react when neutrons move into the sensing layer. The second semiconductor layer is located under the sensing layer, wherein the second semiconductor layer is substantially non-conducting and is substantially undoped.

Another embodiment of the present disclosure provides a system for detecting neutrons. The system comprises a plurality of arrays arranged in a stack. The system also comprises a plurality of diodes in the plurality of arrays in the stack. The system also comprises a plurality of sensing layers. A sensing layer in the plurality of sensing layers is located in each diode of the plurality of diodes and the sensing layer reacts in response to a presence of neutrons.

Yet another embodiment of the present disclosure provides a method for creating a neutron detector. The method comprises creating a number of diodes with a first set of layers which are intrinsic on either side of a sensing layer which is a conductor. The sensing layer reacts to neutrons. The method also comprises laying out a first array of a first set of the number of diodes. The method also comprises laying out a second array of a second set of the number of diodes. The method also comprises stacking the first array and the second array to form a stack of arrays. The number of diodes in the stack of arrays are configured to detect neutrons and provide data based on which diodes in the number of diodes in the stack of arrays detect neutrons.

Yet another embodiment of the present disclosure provides a method for neutron detection. The method comprises receiving neutrons into a number of sensing layers of a plurality of diodes of a number of arrays. Each diode has a sensing layer. A plurality of reactions between the neutrons and each sensing layer of the number of sensing layers are captured in a set of layers for each sensing layer in the number of sensing layers. Each sensing layer is located between the set of layers for each sensing layer. Each set of layers are intrinsic. The method also comprises generating a current pulse for each sensing layer of the number of sensing layers in response to capturing the result of a reaction between the neutrons and each sensing layer of the number of sensing layers.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
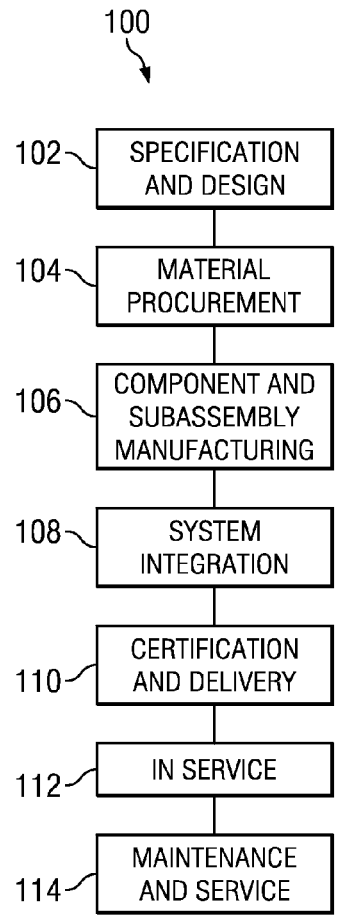
FIG. 1 is an illustration of an aircraft manufacturing and service method in accordance with an advantageous embodiment.
Figure 2:
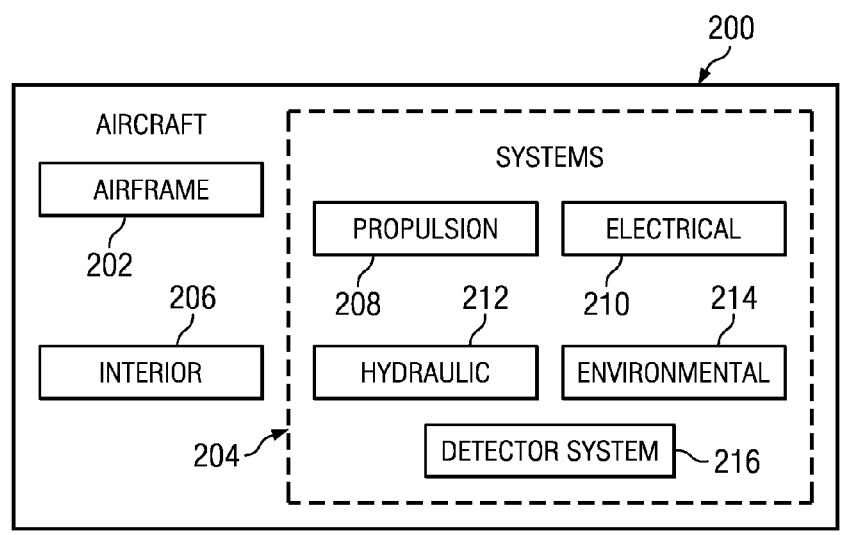
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of plurality of systems 204 include one or more of propulsion 208, electrical 210, hydraulic 212, environmental 214, and detector system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

An embodiment of the present disclosure provides a method and apparatus for neutron detection. The method comprises receiving neutrons into a number of sensing layers of a plurality of diodes of a number of arrays. Each diode has a sensing layer. A plurality of reactions between the neutrons and each sensing layer of the number of sensing layers are captured in a set of layers for each sensing layer in the number of sensing layers. Each sensing layer is located between the set of layers for each sensing layer. Each set of layers are intrinsic. The method also comprises generating a current pulse for each sensing layer of the number of sensing layers in response to capturing the result of a reaction with the neutrons and each sensing layer of the number of sensing layers.

Figure 3:
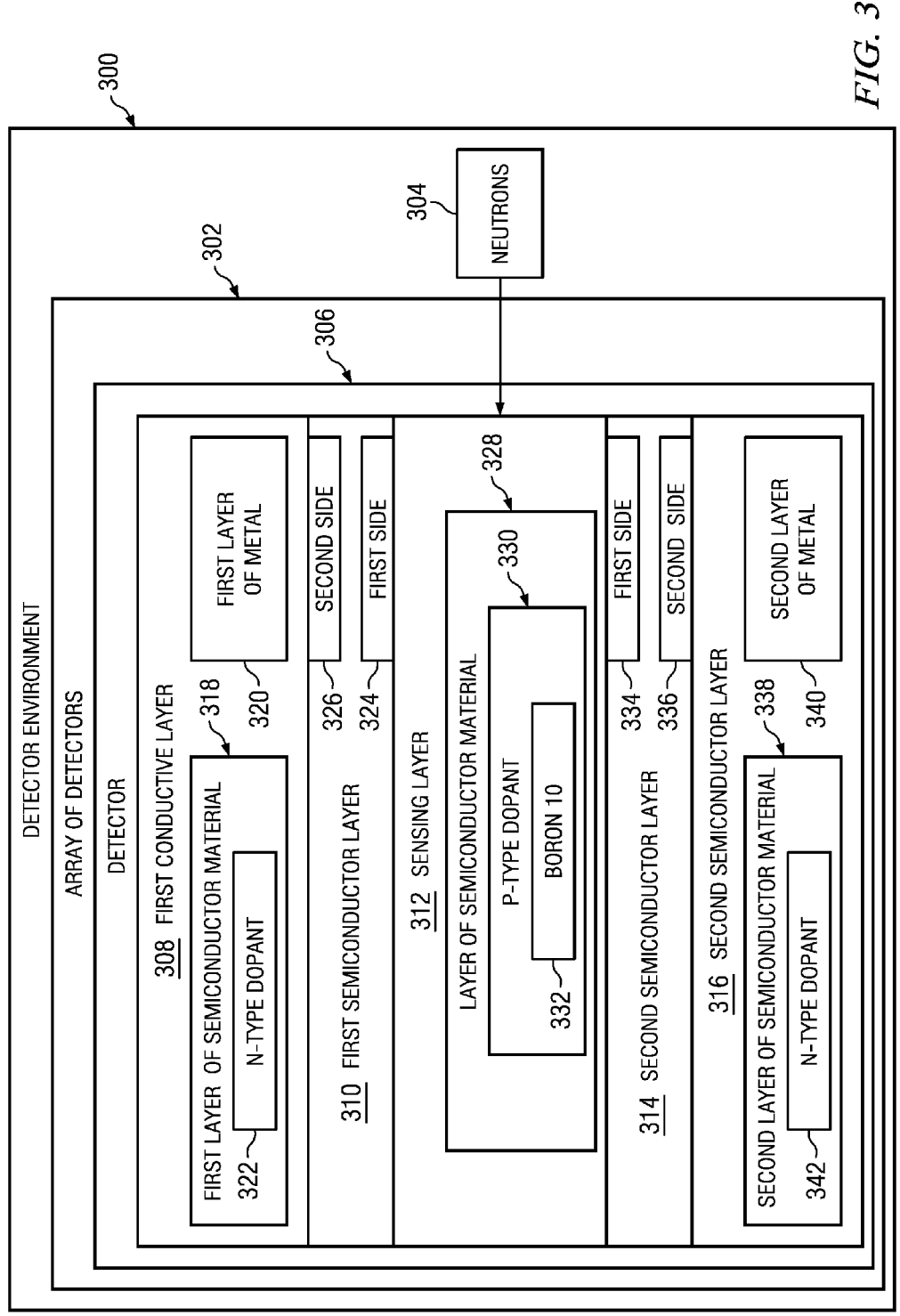
FIG. 3 is an illustration of a block diagram of a detector environment in accordance with an advantageous embodiment.

Turning now to FIG. 3, an illustration of a block diagram of a detector environment is depicted in accordance with an advantageous embodiment. Detector environment 300 may be implemented along with detector system 218 illustrated in FIG. 2. Detector environment 300 may comprise array of detectors 302 and neutrons 304.

Neutrons 304 may be subatomic particles with no electric charge. Neutrons 304 may be emitted during non-ionizing radiation from a source.

Array of detectors 302 may be a plurality of detectors which detect neutrons, such as neutrons 304. Array of detectors 302 may comprise detector 306. Detector 306 may detect the presence of neutrons 304. Detector 306 may comprise first conductive layer 308, first semiconductor layer 310, sensing layer 312, second semiconductor layer 314, and second semiconductor layer 316. Detector 306 may be referred to as a dual PIN diode.

A PIN diode may have three regions; a p-type, n-type, and intrinsic region. P-type regions may be a semiconductor that has been doped in a positive manner. P-type regions may maintain an absence of electrons in a normal state. Doping is the process of introducing impurities to a piece of intrinsic semiconductor to change the semiconductor's electrical properties. N-type regions may be a semiconductor material that has been doped in a negative manner. N-type regions may maintain an abundance of electrons in a normal state. Intrinsic regions of a semiconductor may be pure semiconductor material which is not doped. A pure semiconductor may maintain an electrical conductivity between that of a conductor and an insulator.

A dual PIN diode may have one p-type region with two intrinsic regions and two n-type regions. In different advantageous embodiments, a dual PIN diode may have one n-type region with two intrinsic regions and two p-type regions.

First conductive layer 308 may be a n-type doped region. First conductive layer 308 may have first layer of semiconductor material 318 and first layer of metal 320. First layer of semiconductor material 318 may be n-type dopant 322. First layer of metal 320 may be connected to a wire leading to further electronics used in combination with detector 306.

First semiconductor layer 310 may be an intrinsic semiconductor. First semiconductor layer 310 may have first side 324 and second side 326. First side 324 may be next to sensing layer 312. Second side 326 may be next to first conductive layer 308. First semiconductor layer 310 may be substantially non-conducting. First semiconductor layer 310 may become conducting when introduced to particles such as Helium 4 and/or Lithium 7.

Sensing layer 312 may be a p-type doped region of semiconductor material when using Boron 10 332. In different advantageous embodiments, sensing layer 312 may be an n-type doped region of semiconductor material when other types of elements is used, such as Cadmium. Furthermore, when sensing layer 312 is an n-type doped region, first conductive layer 308 and second semiconductor layer 316 may be p-type doped regions. Sensing layer 312 may comprise layer of semiconductor material 328. Layer of semiconductor material 328 may comprise p-type dopant 330. P-type dopant 330 may be, for example, Boron 10 332.

Sensing layer 312 may react to the presence of neutrons 304. When neutrons 304 are introduced to sensing layer 312, neutrons 304 may react with Boron 10 332 particles to cause Boron 10 332 particles to separate into a number of other particles, such as, for example, Helium 4 and Lithium 7 particles.

Second semiconductor layer 314 may be an intrinsic semiconductor. Second semiconductor layer 314 may have first side 334 and second side 336. First side 334 may be next to sensing layer 312. Second side 336 may be next to second semiconductor layer 316. Second semiconductor layer 314 may be substantially non-conducting. Second semiconductor layer 314 may become conducting when introduced to particles such as Helium 4 and/or Lithium 7.

Second semiconductor layer 316 may be a n-type doped region. Second semiconductor layer 316 may have second layer of semiconductor material 338 and second layer of metal 340. Second layer of semiconductor material 338 may be n-type dopant 342. Second layer of metal 340 may be connected to a wire leading to further electronics used in combination with detector 306.

Figure 4:
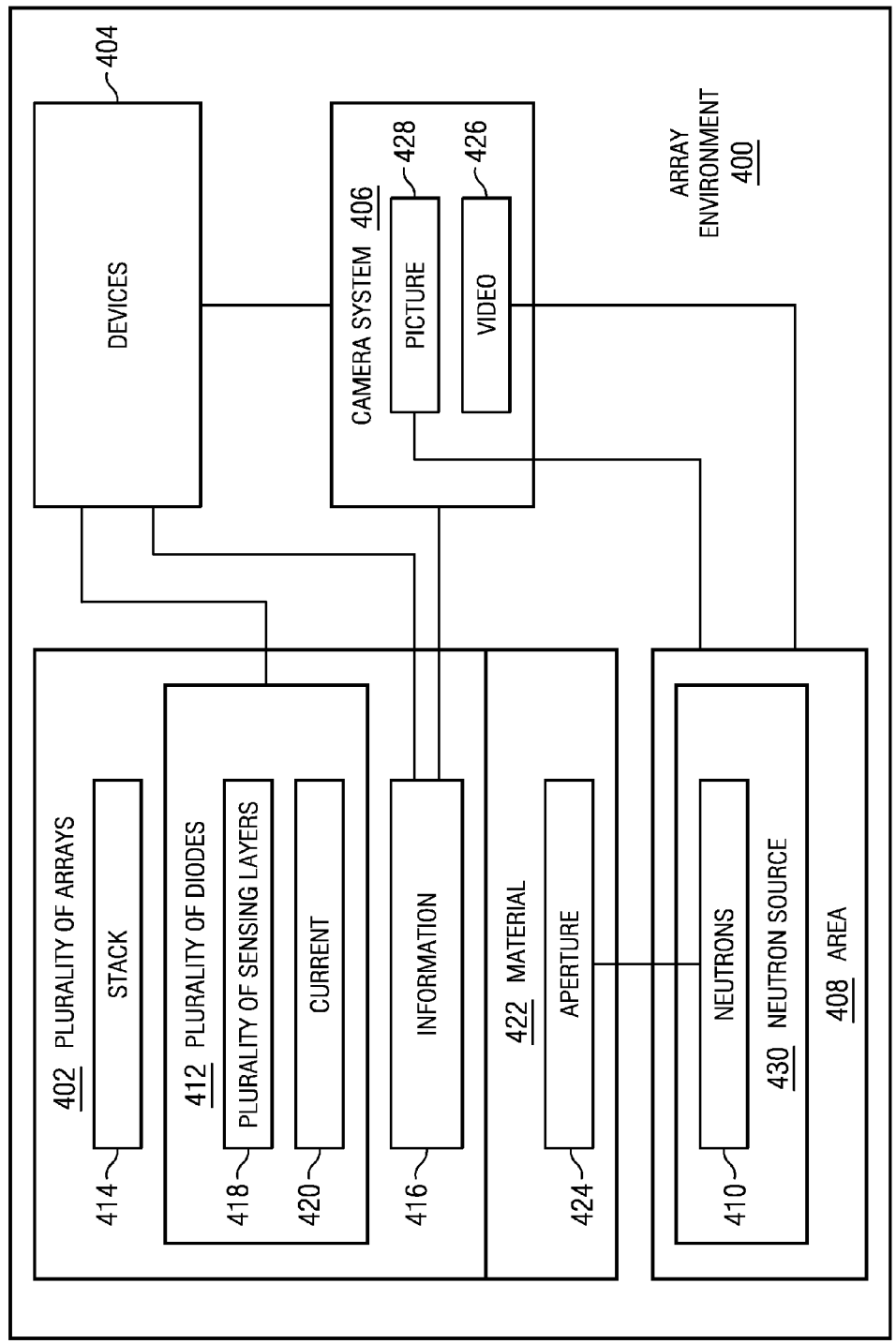
FIG. 4 is an illustration of a block diagram of an array environment in accordance with an advantageous embodiment.

Turning now to FIG. 4, an illustration of a block diagram of an array environment is depicted in accordance with an advantageous embodiment. Array environment 400 may be implemented along with detector environment 300 illustrated in FIG. 3. Array environment 400 may comprise plurality of arrays 402, devices 404, camera system 406, and area 408.

Plurality of arrays 402 may be arrays used to detect neutrons, such as neutrons 410. Plurality of arrays 402 may have arrays of plurality of diodes 412. Plurality of diodes 412 may be arranged in stack 414. Stack 414 may be any number of arrays of plurality of diodes 412 stacked on top of each other. Stack 414 may provide information 416 about the angle that neutrons 410 entered stack 414.

Plurality of diodes 412 may have a plurality of sensing layers 418 which react to the presence of neutrons 410. The more neutrons 410 present in plurality of sensing layers 418, the more current 420 plurality of diodes allows to flow.

One or more ends of stack 414 may have material 422. Material 422 may be any material which prevents the passage of neutrons 410. Material 422 may have aperture 424. Aperture 424 may be of any size or shape, such as a circle, square, oval, or any other shape. Aperture 424 allows the passage of neutrons 410 through to plurality of arrays 402.

Devices 404 may be connected to plurality of diodes 412. Devices 404 may be electronic components which detect current 420 from each diode in the plurality of diodes 412. Current 420 may be an indication that neutrons 410 are present in that particular diode of plurality of diodes 412.

Camera system 406 may take video 426 and/or pictures 428 of area 408 in which aperture 424 may be directed towards. Combining information 416 with data collected from devices 404 and video 426 and/or pictures 428, a neutron source 430 may be able to be identified.

Figure 5:
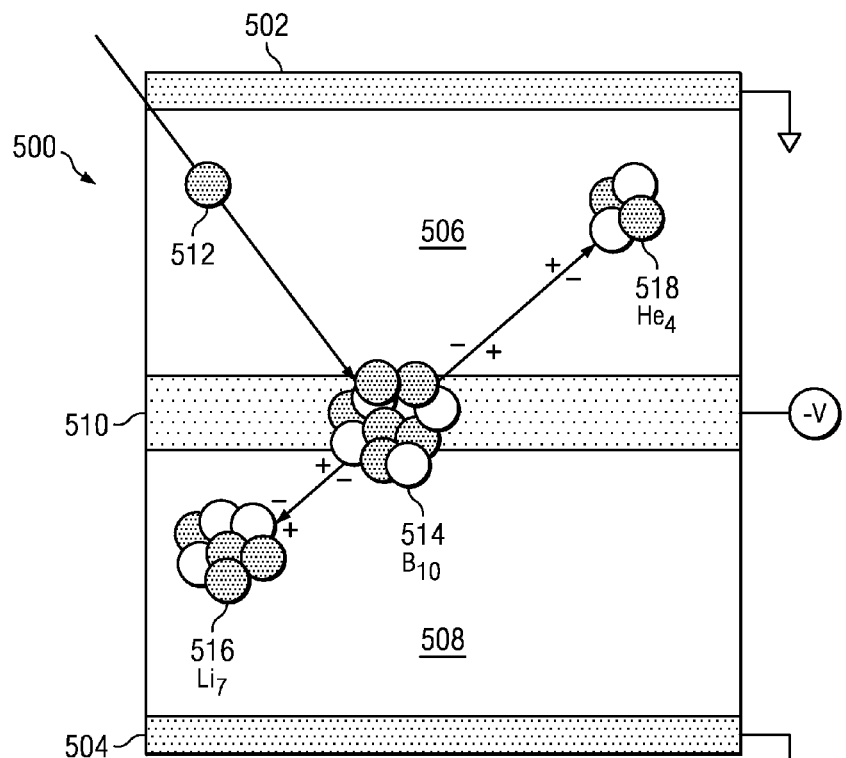
FIG. 5 is an illustration of a dual PIN diode in accordance with an advantageous embodiment.

Turning now to FIG. 5, an illustration of a dual PIN diode is depicted in accordance with an advantageous embodiment. Dual PIN diode 500 may be implemented along with detector environment 300 illustrated in FIG. 3. Dual PIN diode 500 may comprise n-type regions 502 and 504, intrinsic regions 506 and 508, and p-type region 510.

Neutron 512 may pass through n-type regions 502 and 504 as well as intrinsic regions 506 and 508 to come in contact with Boron 10 514 particles in p-type region 510. Responsive to contact with neutron 512, Boron 10 514 may split into two separate particles. Boron 10 514 may split into Lithium 7 516 and Helium 4 518 particles. Lithium 7 516 and Helium 4 518 may split in substantially opposite directions.

Lithium 7 516 and Helium 4 518 may cause intrinsic regions 506 and 508 to become charged. While charged, intrinsic regions 506 and 508 may conduct a current.

Figure 6:
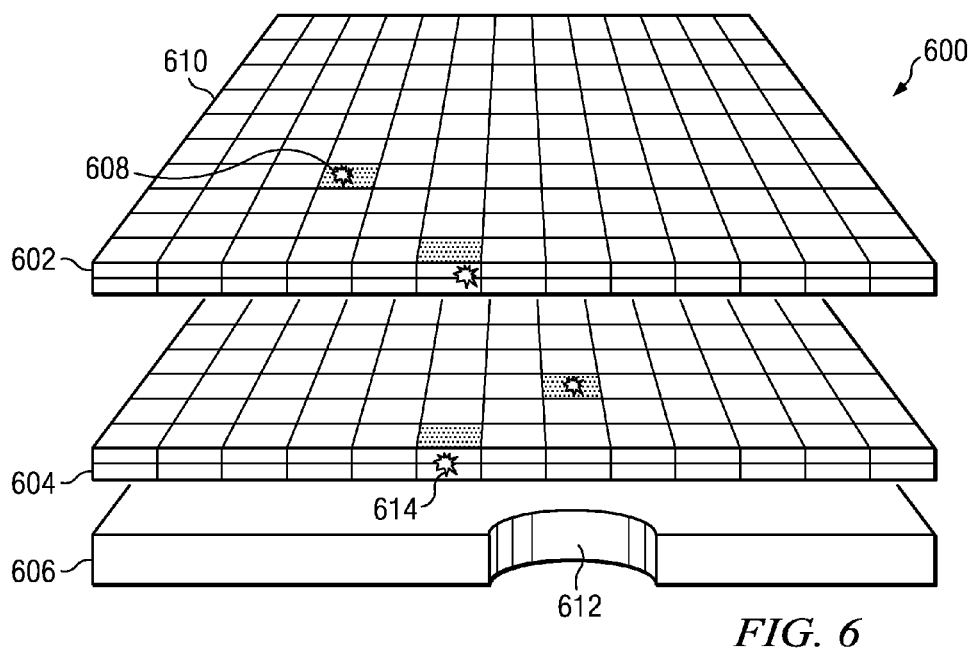
FIG. 6 is an illustration of an array environment in accordance with an advantageous embodiment.

Turning now to FIG. 6, an illustration of an array environment is depicted in accordance with an advantageous embodiment. Array environment 600 may be one example of one implementation of array environment 400 illustrated in FIG. 4. Array environment 600 may comprise array 602, array 604, and material 606.

Arrays 602 and 604 each contain a plurality of diodes which may also be referred to as pixels. Pixel 608 is an example of a pixel where a sensing layer has reacted with a neutron. Pixel 610 is a pixel with no neutrons present. For the purposes of clarity, the disclosure refers to no neutrons being present when neutrons exist in the atmosphere. However, the neutrons that exist in the atmosphere are of a nominal amount.

Aperture 612 is located in material 606. Aperture 612 allows the neutrons, such as neutron 614 to pass through to arrays 602 and 604. The pixel combined with the placement of aperture 612 may give information such as an angle of arrival of the neutron, such as neutron 614. The information combined with other data, such as a map, picture, video, and/or speed of arrays 602 and 604 may indicate a location of a source of neutron 614.

Figure 7:
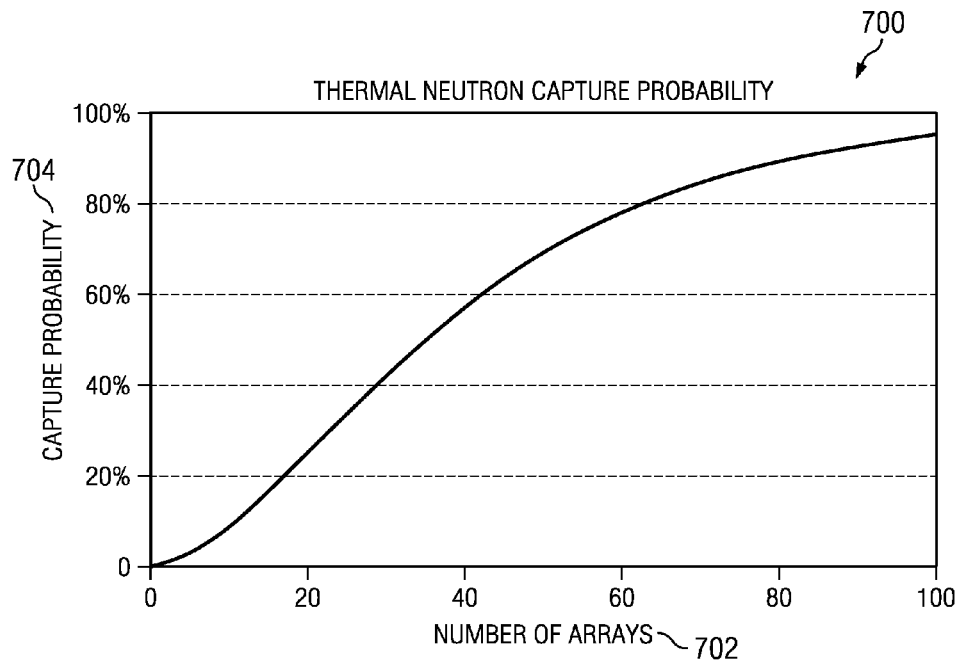
FIG. 7 is an illustration of a chart of neutron capture probability depicted in accordance with an advantageous embodiment.

Turning now to FIG. 7, an illustration of a chart of neutron capture probability is depicted in accordance with an advantageous embodiment. Chart 700 may indicate the neutron capture probability for a neutron entering an array environment, such as array environment 400 of FIG. 4. Chart 700 comprises two sets of data, number of arrays 702 and capture probability 704 for the number of arrays. Number of arrays 702 indicates the number of layers of arrays in the detector. Capture probability 704 indicates the percentage chance of capturing a neutron with the number of arrays. As the number of arrays increases, percentage chance that a neutron is captured by the arrays increases.

For example, with 60 arrays in number of arrays 702, there is about an 80% chance of capture as indicated in capture probability 704.

Figure 8:
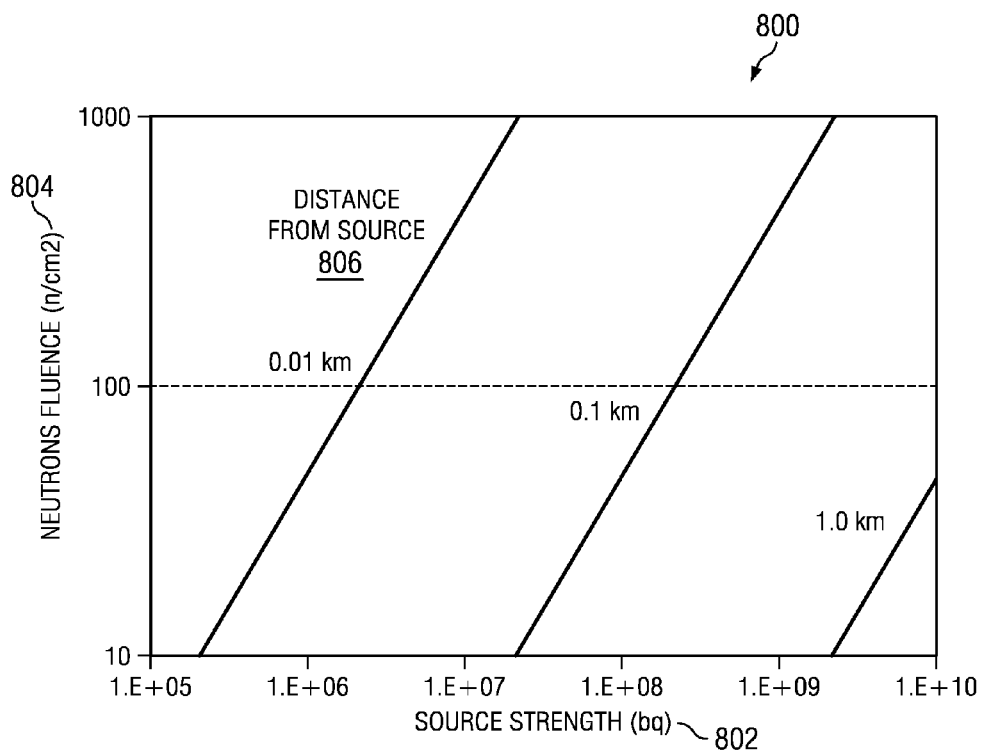
FIG. 8 is an illustration of a chart of source detection depicted in accordance with an advantageous embodiment.

Turning now to FIG. 8, an illustration of a chart of source detection is depicted in accordance with an advantageous embodiment. Chart 800 may indicate what source strengths and neutrons fluence are needed to identify a source of the neutrons. Chart 800 comprises source strength 802, neutrons fluence 804, and distance from source 806. Chart 800 shows the source strength 802 to neutrons fluence 804 readings ratio for distances of 10 meters, 100 meters, and 1000 meters. Neutrons fluence readings may be at the arrays.

Source strength 802 may be the strength of the source of the neutrons measured in becquerel (Bq) to measure radioactivity. One becquerel is 1 disintegration per second. Neutrons fluence 804 may be the number of particles traversing a unit area in a certain point in space in a unit period of time.

Neutrons fluence 804 may be measured in neutrons per square centimeters. Distance from source 806 may be the distance neutrons fluence 804 reading is from the source.

For example, the source strength is about 300 million becquerel when the neutrons fluence reading is 100 neutrons per centimeters squared at a distance of 100 meters from the source.

Figure 9:
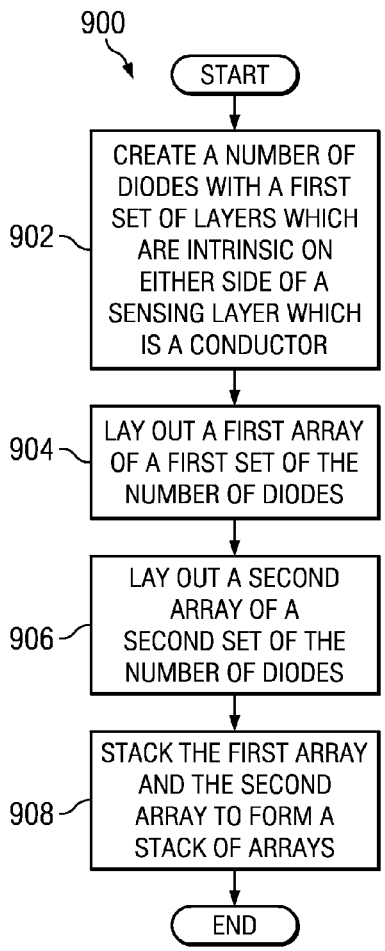
FIG. 9 is an illustration of a flowchart of a process for creating a neutron detector in accordance with an advantageous embodiment.

FIG. 9 is an illustration of a flowchart of a process for creating a neutron detector in accordance with an advantageous embodiment. The process is generally designated by reference number 900, and may be implemented in a detector environment, such as detector environment 300 illustrated in FIG. 3.

The process begins by creating a number of diodes with a first set of layers which are intrinsic on either side of a sensing layer which is a conductor (operation 902). The sensing layer may react to neutrons. The process also lays out a first array of a first set of the number of diodes (operation 904). The process also lays out a second array of a second set of the number of diodes (operation 906). The first array and the second array are stacked to form a stack of arrays (operation 908). The number of diodes in the stack of arrays are configured to detect neutrons and provide data based on which diodes in the number of diodes in the stack of arrays detect neutrons.

Figure 10:
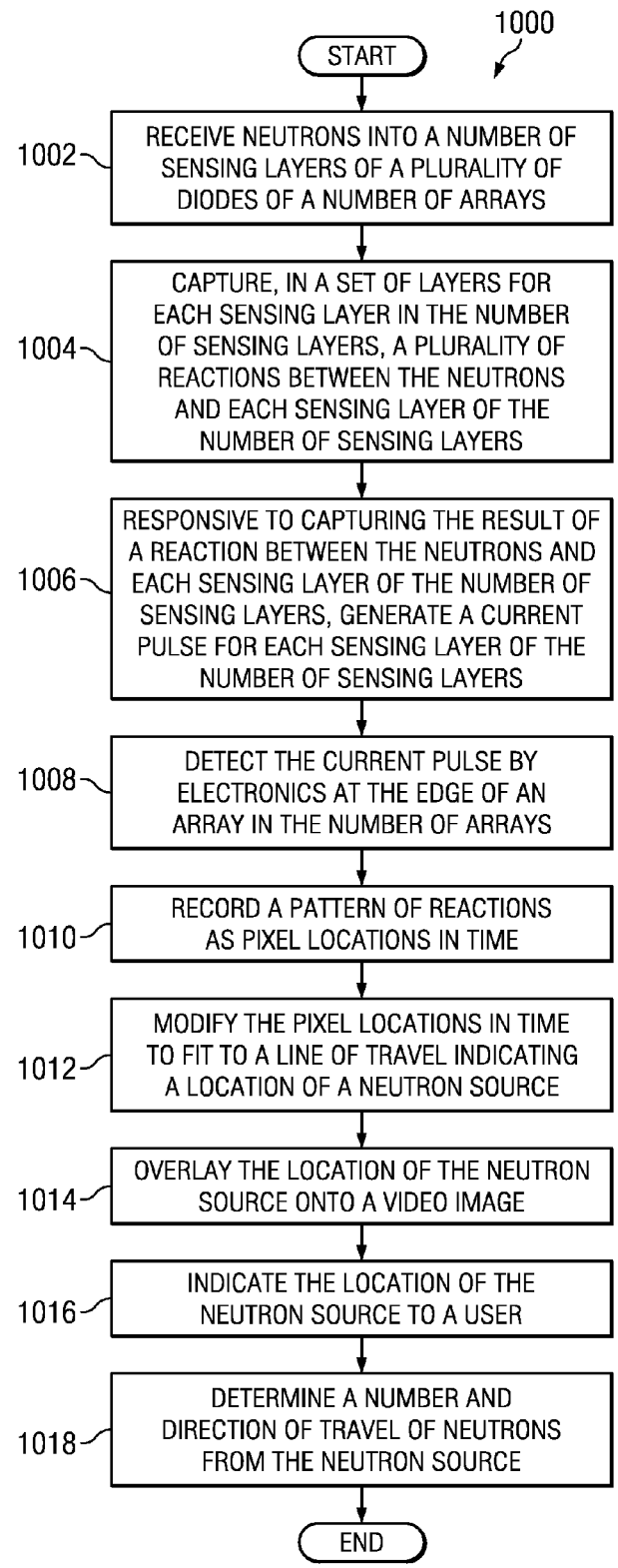
FIG. 10 is an illustration of a flowchart of a process for neutron detection in accordance with an advantageous embodiment.

FIG. 10 is an illustration of a flowchart of a process for neutron detection in accordance with an advantageous embodiment. The process is generally designated by reference number 1000, and may be implemented in an array environment, such as array environment 400 illustrated in FIG. 4.

The process begins by receiving neutrons into a number of sensing layers of a plurality of diodes of a number of arrays (operation 1002). Each diode has a sensing layer. A neutron captured in the boron 10, p-type sensing layer, generates a helium 4 and a lithium 7 nuclei that scatters into the intrinsic layers above and below the sensing layer. The current generated in these intrinsic layers above and below the sensing layer is moved into the sensing layer by voltages applied between the outer n-type layers connected to the layers of metal.

A plurality of reactions between the neutrons and each sensing layer of the number of sensing layers is captured in a set of layers for each sensing layer in the number of sensing layers (operation 1004). Each sensing layer is located between the set of layers for each sensing layer. Also, each set of layers are intrinsic. A current pulse is generated for each sensing layer of the number of sensing layers in response to capturing the result of a reaction between the neutrons and each sensing layer of the number of sensing layers (operation 1006).

The process further comprises detecting the current pulse by electronics at the edge of an array in the number of arrays (operation 1008). The process further comprises recording a pattern of reactions as pixel locations in time (operation 1010). The process further comprises modifying the pixel locations in time based on a motion of the number of arrays. The process further comprises modifying the pixel locations in time to fit to a line of travel indicating a location of a neutron source (operation 1012).

The process further comprises overlaying the location of the neutron source onto a video image (operation 1014). The process further comprises indicating the location of the neutron source to a user (operation 1016). The process further comprises determining a number and direction of travel of neutrons from the neutron source (operation 1018).

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

An embodiment of the present disclosure provides a method and apparatus for neutron detection. The method comprises receiving neutrons into a number of sensing layers of a plurality of diodes of a number of arrays. Each diode has a sensing layer. A plurality of reactions between the neutrons and each sensing layer of the number of sensing layers are captured in a set of layers for each sensing layer in the number of sensing layers. Each sensing layer is located between the set of layers for each sensing layer. Each set of layers are intrinsic. The method also comprises generating a current pulse for each sensing layer of the number of sensing layers in response to capturing the result of a reaction with the neutrons and each sensing layer of the number of sensing layers.

An embodiment of the present disclosure recognizes that most neutron detectors may be large in size. The embodiments of the present disclosure provide small neutron detectors by using silicon microcircuit fabrication technology. Additionally, using silicon microcircuit fabrication technology saves costs.

The embodiments of the present disclosure provide a set of arrays that may have as many arrays stacked as necessary for the distance from the source and also remain light enough to fit on smaller aircraft.

The embodiments of the present disclosure provide an image of the neutron source location by curve fitting through the pixels in the set of arrays that detect neutrons. The embodiments of the present disclosure provide recognizing low energy neutrons because of using multiple layers of arrays.

Although the different advantageous embodiments have been described with respect to parts for aircraft, other advantageous embodiments may be applied to parts for other types of vehicles. For example, without limitation, other advantageous embodiments may be applied to other vehicles which have a need to provide a neutron detection system.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications, as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand.

What is claimed is:

1. An apparatus comprising:
a first semiconductor layer, wherein the first semiconductor layer is substantially non-conducting and is substantially undoped, the first semiconductor layer having a first side and a second side;
a sensing layer located under the first semiconductor layer, the sensing layer comprising a layer of semiconductor material having a Boron 10 p-type dopant wherein the sensing layer is configured to react when neutrons move into the sensing layer;
a second semiconductor layer located under the sensing layer, wherein the second semiconductor layer is substantially non-conducting and is substantially undoped, the second semiconductor layer having a first side and a second side;
a first conductive layer located on the second side the first semiconductor layer; and
a second conductive layer located on the second side of the second semiconductor layer, wherein the sensing layer is located on the first side of the first semiconductor layer and the first side of the second semiconductor layer, and wherein the sensing layer is configured such that a neutron captured in the boron 10 sensing layer generates a helium 4 and a lithium 7 nuclei that scatter into the first semiconductor layer and the second semiconductor layer.

2. The apparatus of claim 1, wherein the conductive layers are configured to conduct a current.

3. The apparatus of claim 1, wherein the first conductive layer comprises a first layer of the semiconductor material with an n-type dopant and a first layer of metal and wherein the second conductive layer comprises a second layer of the semiconductor material with an n-type dopant and a second layer of metal.

4. The apparatus of claim 1, wherein the first semiconductor layer, the second semiconductor layer, the sensing layer, the first conductive layer, and the second conductive layer form a detector within a array of detectors in which each detector has the first semiconductor layer, the second semiconductor layer, the sensing layer, the first conductive layer, and the second conductive layer.

5. The apparatus of claim 1, wherein the first semiconductor layer and the second semiconductor layer are each about 6 microns thick.

6. The apparatus of claim 1, wherein the sensing layer is about 1 micron thick.

7. A system for detecting neutrons comprising:
a plurality of arrays arranged in a stack;
a plurality of diodes in the plurality of arrays in the stack; and
plurality of sensing layers, wherein a sensing layer in the plurality of sensing layers is located within each diode of the plurality of diodes and the sensing layer reacts in response to a presence of neutrons, the sensing layer positioned between a first semiconductor layer and a second semiconductor layer, a first conductive layer located on a side the first semiconductor layer opposite the sensing layer and a second conductive layer located on a side of the second semiconductor layer opposite the sensing layer, at least one sensing layer comprising a layer of semiconductor material having a Boron 10 p-type dopant, and the at least one sensing layer configured such that a neutron captured in the boron 10 sensing layer generates a helium 4 and a lithium 7 nuclei that scatter into the first semiconductor layer and the second semiconductor layer of the diodes positioned above and below the sensing layer.

8. The system of claim 7 further comprising:
a material with an aperture located at one end of the stack of plurality of arrays, wherein the material prevents the flow of neutrons, and wherein the neutrons flow through the aperture and into the plurality of arrays.

9. The system of claim 7, wherein the arrays are connected to devices for measuring the current coming from each diode in the arrays.

10. The system of claim 7 further comprising:
a camera system for taking pictures or video of an area, wherein the pictures or video is combined with information provided by the arrays to determine a location of a neutron source.

11. A method for creating a neutron detector comprising:
creating a number of diodes comprising a first semiconductor layer and a second semiconductor layer which are intrinsic on either side of a sensing layer, the sensing layer comprising a conductor and reacts to neutrons, the sensing layer comprising a layer of semiconductor material having a Boron 10 p-type dopant, and the sensing layer configured such that a neutron captured in the boron 10 sensing layer generates a helium 4 and a lithium 7 nuclei that scatter into layers of the diodes positioned above and below the sensing layer, a first conductive layer located on a side the first semiconductor layer opposite the sensing layer and a second conductive layer located on a side of the second semiconductor layer opposite the sensing layer;
laying out a first array of a first set of the number of diodes;
laying out a second array of a second set of the number of diodes; and
stacking the first array and the second array to form a stack of arrays, wherein the number of diodes in the stack of arrays are configured to detect neutrons and provide data based on which diodes in the number of diodes in the stack of arrays detect neutrons.

12. The method of claim 11 further comprising:
providing a camera system for taking pictures or video of an area
combining the pictures or video with the data provided by the arrays to determine a location of a neutron source.

13. The method of claim 11 further comprising:
locating the stack of arrays onto a vehicle.

14. The method of claim 13, wherein the step of locating the stack of arrays onto a vehicle further comprises locating the stack of arrays onto a military vehicle, an automobile, an aircraft, or an unmanned vehicle.

15. A method for neutron detection comprising:
receiving neutrons into a number of sensing layers of a plurality of diodes of a number of arrays with each diode having a sensing layer, the sensing layer comprising a layer of semiconductor material having a Boron 10 p-type dopant, each diode comprising the sensing layer positioned between a first semiconductor and a second semiconductor, a first conductive layer located on a side the first semiconductor layer opposite the sensing layer and a second conductive layer located on a side of the second semiconductor layer opposite the sensing layer;
capturing, in the first semiconductor layer and the second semiconductor layer which are intrinsic a plurality of reactions between the neutrons and each sensing layer of the number of sensing layers including capturing helium 4 and lithium 7 nuclei that scatter into the first semiconductor layer and the second semiconductor layer; and
responsive to capturing a result of a reaction between the neutrons and each sensing layer of the number of sensing layers, generating a current pulse for each sensing layer of the number of sensing layers.

16. The method of claim 15 further comprising:
detecting the current pulse by electronics at the edge of an array in the number of arrays.

17. The method of claim 15 further comprising:
recording a pattern of the reactions as pixel locations in time.

18. The method of claim 17 further comprising:
recording of a number of pixel locations and times to fit to a line of travel indicating a location of a neutron source.

19. The method of claim 18 further comprising:
overlaying the location of the neutron source onto a video image.

20. The method of claim 18 further comprising:
indicating the location of the neutron source to a user.

21. The method of claim 17 further comprising:
determining a number and direction of travel of neutrons from the neutron source.

\* \* \* \* \*